April 6, 1943.   D. S. HAKE ET AL   2,315,519
TREATMENT OF ZIRCONIUM OXIDE
Filed Oct. 16, 1940
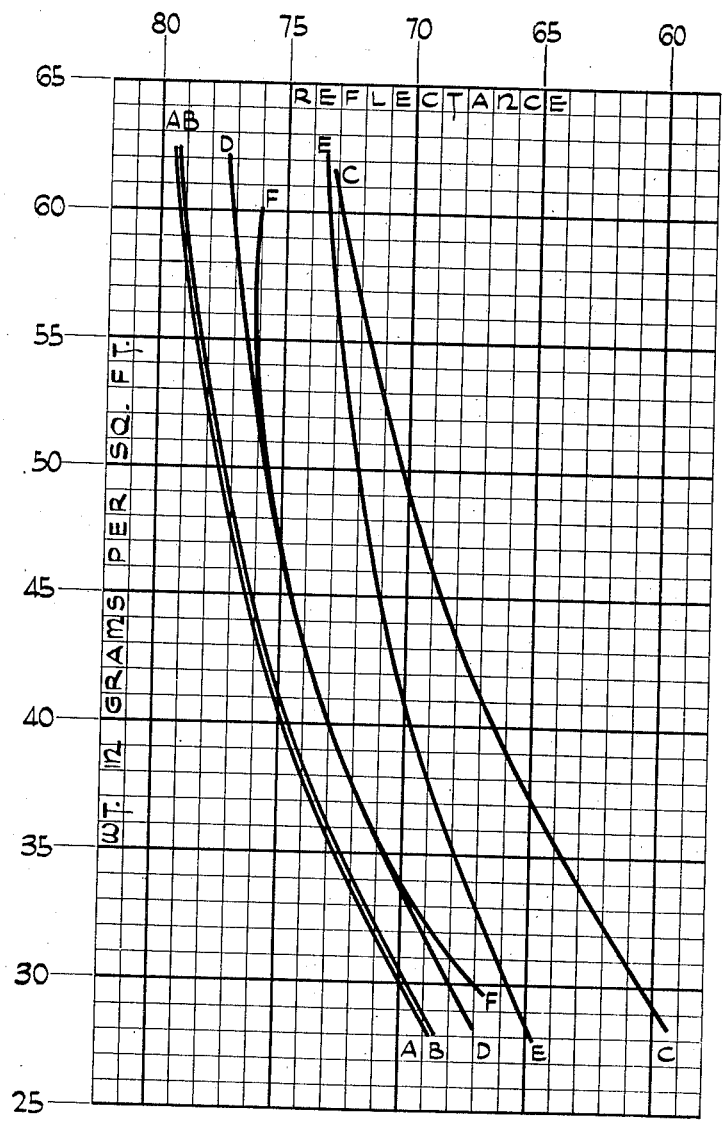
INVENTORS
DONALD S. HAKE &
HAROLD D. PRIOR
BY
Beau, Brooks, Buckley & Beau.
ATTORNEYS Patented Apr. 6, 1943

2,315,519

UNITED STATES PATENT OFFICE 2,315,519

TREATMENT OF ZIRCONIUM OXIDE

Donald S. Hake and Harold D. Prior, Niagara Falls, N. Y., assignors to The Titanium Alloy Manufacturing Company, New York, N. Y., a corporation of Maine Application October 16, 1940, Serial No. 361,438

6 Claims. (Cl. 23—140)

This invention relates to the treatment of zirconium oxide, particularly to render it suitable for use as an opacifier in vitreous enamels.

Zirconium oxide has long been known as an opacifier for vitreous enamels. In its use as such, it is customarily milled with an enamel frit and water, and the slip thus formed applied to a suitable base, such as iron, and fired. For best results, the physical form and particle size of the zirconium oxide is of great importance, and even exceptionally pure and white zirconium oxide does not give good results if the particle size is of the wrong order. Thus, it has been found that particle sizes between 0.4 and 1 micron are the most effective in securing proper opacity. In accordance with this invention, there is provided a new and improved method of securing zirconium oxide, of the required particle sizes, highly useful as an opacifier for vitreous enamels.

In substance, this new and improved method comprises, in its preferred form, heating a mixture containing a suitable zirconium oxide and a minor quantity of silica with at least two and a half times its weight of molten caustic soda, allowing the melt thus formed to cool and solidify, leaching with water and acid, drying and calcining.

In the practice of this invention, it has been found that the presence of a certain amount of silica, as such, is necessary to secure a final product of the required particle sizes and suitable for use as an opacifier. Without the presence of silica, the fusion with caustic soda does not produce the required particle sizes except to a very limited and insufficient extent. The silica probably acts as a sort of catalyst, and the amount necessary to produce this effect is not very large, preferably coming within the limits of 2 to 10% of the amount of zirconium oxide present. As the zirconium oxide is the effective agent in producing opacity, the presence of excessive quantities of silica dilutes the effect of the zirconium oxide. Therefore, an amount of silica just necessary to produce the required particle sizes is preferably used. The silicon should be present as silica in order to accomplish this effect. For example, the silicon in zirconium silicate or zircon is not effective for this purpose. Likewise, although silicon carbide, which may occur in zirconium oxide produced by some methods, oxidizes at high temperatures to silica, this does not occur instantaneously. If it does not completely oxidize until towards the end of the treatment with caustic soda, it will not have its full effect in achieving the proper particle sizes. Therefore, it is necessary to add a certain amount of silica as such in order to secure the desired results.

Some zirconium oxides, however, do contain a certain amount of silica as such, and to these lesser amounts or even no silica at all need be added. Such a zirconium oxide is that described in pending application for patent of Kinzie, Easton and Efimoff, Serial No. 308,236, filed December 8, 1939, now Patent No. 2,270,527.

When silicon carbide is present, small amounts of sodium nitrate are preferably added in order to aid oxidation of the silicon carbide into silica. Under certain conditions, it is sometimes advantageous to add a small amount of borax, but in general the advantages to be gained are not sufficient to warrant its use. When there is not enough silica present, the borax may aid in securing a final product of the proper particle size.

The zirconium oxide used as the starting material in the practice of the present invention is preferably a relatively pure material, such as those produced in accordance with the methods described in U. S. Patents Nos. 1,351,091, 2,110,733 or 2,168,603. In using the product of the present invention as an opacifier, it is of course desirable in most cases that it be white in color, which means that it should be relatively free of colored impurities, such as iron and titanium. For this reason, these purified materials are preferred.

The mixture of zirconium oxide and silica is first milled to a suitable fineness, preferably —325 mesh, and is then added to molten caustic soda, which is maintained at a temperature above 750° C., in the proportion of at least 2½ parts of caustic soda to 1 part of zirconium oxide, and preferably in a ratio of about 4 to 1. The melt is maintained at the required temperature, after the addition of the zirconium oxide, until all reaction ceases and the melt is quiet. The finished melt is then poured out upon a metal tray, preferably of nickel, and allowed to cool and solidify.

The fusion cake is then leached with water, preferably in the ratio of at least 4 parts of water to 1 part of fusion cake, stirred and allowed to settle. The supernatant liquor, which contains excess free caustic and other soluble compounds, is then drawn off. This washing step is repeated several times, until the product is free of soluble alkali silicates and alkalies. The last remaining soluble material can be removed by treatment with dilute hydrochloric acid, followed by washing to remove acid and acid salts.

The aqueous slurry is then dried, and calcined at a temperature of 600° to 800° C. to remove all but a trace of tenaciously held water. If the calcination is conducted above 650° C. the ignition loss of the product is practically nil. The resulting product has particles the major portion of which are under 1 micron in size, while the average is from 0.5 to 0.8 micron.

The invention having been described, the following illustrative examples are given:

Example 1

100 grams of zirconium oxide containing about 0.7% silicon carbide, as produced by oxidation of zirconium carboxide (formed from zircon in the electric resistance furnace), is mixed with 5 grams of silica, 5 grams of $NaNO_3$ and 5 grams of $Na_2B_4O_7$, and milled to −325 mesh. This mixture is added and stirred into 400 grams of caustic soda at a temperature of 750° C. and reacted at that temperature until the reaction is complete, this requiring from 45 minutes to 1 hour. The mass is cast upon a nickel tray and allowed to solidify. The frozen cake is leached in 4 liters of water, stirred up to a smooth fluid, allowed to settle, and then decanted. This is repeated four times. In the last repetition, 50% aqueous hydrochloric acid is added drop by drop until the slurry remains acid to litmus. It is settled and decanted, followed by one more wash. The slurry is dried at 130° C. and calcined at 600° C. This gives a white zirconium oxide of excellent opaquing powers, having very few particles over 1 micron in size, with an average of 0.5 micron and high uniformity. It has approximately the following analysis:

| | Per cent |
|---|---|
| Ignition loss | 1.27 |
| $Na_2O$ | 0.005 |
| CaO | 0.40 |
| $SiO_2$ | 1.2 |
| $TiO_2$ | 0.1 |
| $ZrO_2$ | Balance |

In contrast to the above example, a procedure which was exactly the same except for the omission of the 5 grams of silica, resulted in a product of very low opaquing effects, although it was white and clean, with most of the particles over 2 microns in size.

Example 2

100 grams of zirconium oxide, as produced by oxidation of zirconium cyanonitride (formed from zircon in the electric arc furnace), containing 4 to 6 grams of silica, with 5 grams of $NaNO_3$ and 5 grams of $Na_2B_4O_7$, is milled to −325 mesh. This is stirred into 400 grams of molten caustic soda and treated as in Example 1. This gives a white zirconium oxide of excellent opaquing powers, having 80–90% of the particles less than 1 micron in size, with an average of 0.5 to 0.8 micron. It has approximately the following analysis:

| | Per cent |
|---|---|
| Ignition loss | 1.82 |
| $Na_2O$ | 0.25 |
| CaO | 0.40 |
| $SiO_2$ | 1.3 |
| $TiO_2$ | 0.15 |
| $ZrO_2$ | Balance |

Example 3

100 grams of zirconium oxide, the same raw material as in Example 1, but specially treated to remove all but 0.1% silica and silicon carbide, was mixed with 2 grams of silica, and milled to −325 mesh. This mixture was treated as in Example 1, except that drying took place at 140° C.

The opaquing power of the new zirconium oxide is best illustrated in the accompanying drawing showing graphically the results obtained in enameling tests in which the opacifiers under test were milled with typical frits, clay, water, etc., and applied to an iron base at the rate of application shown on the graph. The opacity or reflectance was measured by generally accepted means for determining this property in enamels.

In curves A and B the opacifier used was prepared according to Examples 1 and 2, respectively. In curve C the opacifier was prepared according to Example 1 but with the omission of the silica. In curves D and E, the opacifiers were the starting zirconium oxides of Examples 1 and 2, respectively. In curve F the opacifier used was prepared according to Example 3. Except for the opacifiers used, the procedure and composition employed in the enamels represented in all the curves were identical. In each case, 100 parts of a typical frit were milled with 7 parts of enameler's clay, 2½ parts of opacifier, $\frac{1}{10}$ part of $NaNO_2$, and 40 parts of water. This was milled to a fineness of 2 grams residue on a 200 mesh screen from a 100 cc. sample. The enamel was fired for 2½ minutes at 1520° F. The surface of the enamels was satisfactory in all cases except D, where the surface was poor.

As many variations are possible within the scope of this invention, it is not intended to be limited except as defined by the appended claims.

We claim:

1. A method of treating zirconium oxide to render it suitable for use as an opacifier for vitreous enamels, comprising mixing zirconium oxide and 2 to 10% of silica based on the weight of the zirconium oxide with at least 2½ parts of molten caustic soda to each part of zirconium oxide, solidifying, leaching out soluble sodium and silicon compounds with water and acid, drying, and calcining.

2. A method of treating zirconium oxide to render it suitable for use as an opacifier for vitreous enamels, comprising mixing milled zirconium oxide and 2 to 10% of silica based on the weight of the zirconium oxide with at least 2½ parts of molten caustic soda to each part of zirconium oxide at a temperature of at least 750° C., solidifying, leaching out soluble sodium and silicon compounds with water and acid, drying, and calcining at a temperature of 600° to 800° C.

3. A method of treating zirconium oxide to render it suitable for use as an opacifier for vitreous enamels, comprising mixing zirconium oxide, 2 to 10% of silica based on the weight of the zirconium oxide, sodium nitrate and sodium borate with molten caustic soda, solidifying, leaching out soluble sodium and silicon compounds with water, drying, and calcining.

4. A method of treating zirconium oxide to render it suitable for use as an opacifier for vitreous enamels, comprising mixing zirconium oxide, 2 to 10% of silica based on the weight of the zirconium oxide, sodium nitrate and sodium borate with at least 2½ parts of molten caustic soda to each part of zirconium oxide, solidifying, leaching out soluble sodium and silicon compounds with water and acid, drying, and calcining.

5. A method of treating zirconium oxide to render it suitable for use as a opacifier for vitreous enamels, comprising mixing zirconium oxide, 2 to 10% of silica based on the weight of the zirconium oxide, sodium nitrate and sodium borate with at least 2½ parts of molten caustic soda to each part of zirconium oxide at a temperature of at least 750° C., solidifying, leaching out soluble sodium and silicon compounds with water and acid, drying, and calcining at a temperature of 600° to 800° C.

6. A method of treating zirconium oxide to render it suitable for use as an opacifier for vitreous enamels, comprising mixing zirconium and about 5% each, based on the weight of the zirconium oxide, of silica, sodium nitrate and sodium borate with about 5 parts of molten caustic soda to each part of zirconium oxide at a temperature of at least 750° C., solidifying, leaching out soluble sodium and silicon compounds with water and acid, drying, and calcining at a temperature of 600° to 800° C.

DONALD S. HAKE.
HAROLD D. PRIOR.